United States Patent
Corwin et al.

(10) Patent No.: US 9,108,580 B2
(45) Date of Patent: Aug. 18, 2015

(54) BUMPER SYSTEM WITH PEDESTRIAN-FRIENDLY LOWER APRON

(71) Applicant: Shape Corp., Grand Haven, MI (US)

(72) Inventors: Cort Corwin, Grand Haven, MI (US); Devesh Kumar Soni, Pune (IN); Craig Oomen, Grand Rapids, MI (US)

(73) Assignee: Shape Corp., Grand Haven, MI (US)

( * ) Notice: Subject to any disclaimer, the term of this patent is extended or adjusted under 35 U.S.C. 154(b) by 0 days.

(21) Appl. No.: 14/244,254

(22) Filed: Apr. 3, 2014

(65) Prior Publication Data
US 2014/0306482 A1    Oct. 16, 2014

Related U.S. Application Data

(60) Provisional application No. 61/810,851, filed on Apr. 11, 2013, provisional application No. 61/924,979, filed on Jan. 8, 2014.

(51) Int. Cl.
*B60R 19/02* (2006.01)
*B60R 19/12* (2006.01)
*B60R 21/34* (2011.01)
*B60R 19/18* (2006.01)

(52) U.S. Cl.
CPC ........... *B60R 19/12* (2013.01); *B60R 2019/188* (2013.01); *B60R 2021/343* (2013.01)

(58) Field of Classification Search
CPC .. B60R 19/12; B60R 21/34; B60R 2021/343; B60R 2019/188
See application file for complete search history.

(56) References Cited

U.S. PATENT DOCUMENTS

| | | | |
|---|---|---|---|
| 4,460,213 A | 7/1984 | Janssen et al. | |
| 4,770,457 A | 9/1988 | Tomforde | |
| 4,976,489 A | 12/1990 | Lovelace | |
| 5,692,796 A | 12/1997 | Yamamoto et al. | |
| 6,056,337 A * | 5/2000 | Oguri et al. | 293/142 |
| 8,100,460 B2 | 1/2012 | Butlin, Jr. et al. | |
| 2003/0015890 A1* | 1/2003 | Ahn | 296/194 |
| 2009/0160203 A1 | 6/2009 | Garg et al. | |
| 2011/0169283 A1* | 7/2011 | Salin et al. | 293/133 |
| 2012/0153643 A1 | 6/2012 | Mana et al. | |

* cited by examiner

*Primary Examiner* — Lori L Lyjak
(74) *Attorney, Agent, or Firm* — Price Heneveld LLP

(57) ABSTRACT

An apron for a vehicle front end comprises a unitary plastic component having a front structure and a rear structure joined by an offset portion. The front and rear structures extend at rearward downward angles and in generally parallel directions, and the offset portion extends at a rearward upward angle. The apron has a relatively constant vertical dimension, such that the angled structures define a wave-shaped envelope. Preferably, a horizontal plane extending from the tip of the front structure stays within the wave-shaped envelope, so that impact forces stay within the boundary in a manner providing improved impact strength and greater energy absorption during an impact. At the same time, the front structure provides a homogeneous structure that distributes local impact stresses uniformly and more widely into the rear structure, thus providing a more uniform impact resistance less sensitive to impact location.

17 Claims, 7 Drawing Sheets

Baseline Apron

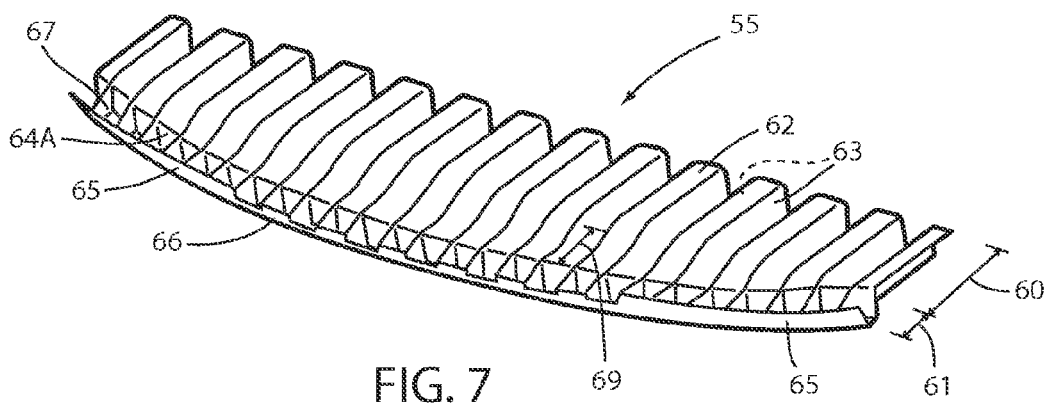
FIG. 7
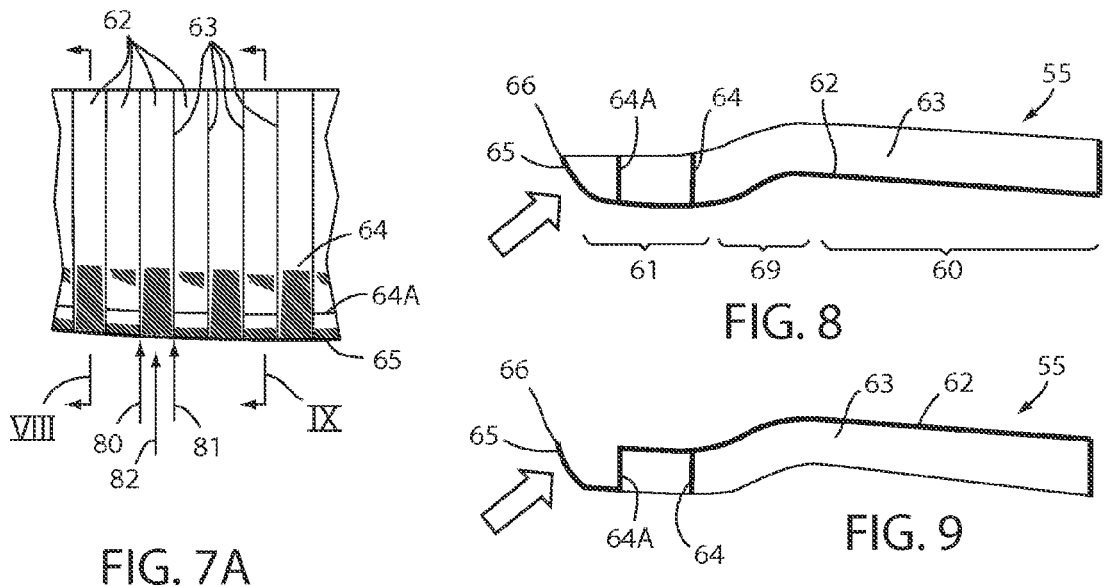
FIG. 7A
FIG. 8
FIG. 9
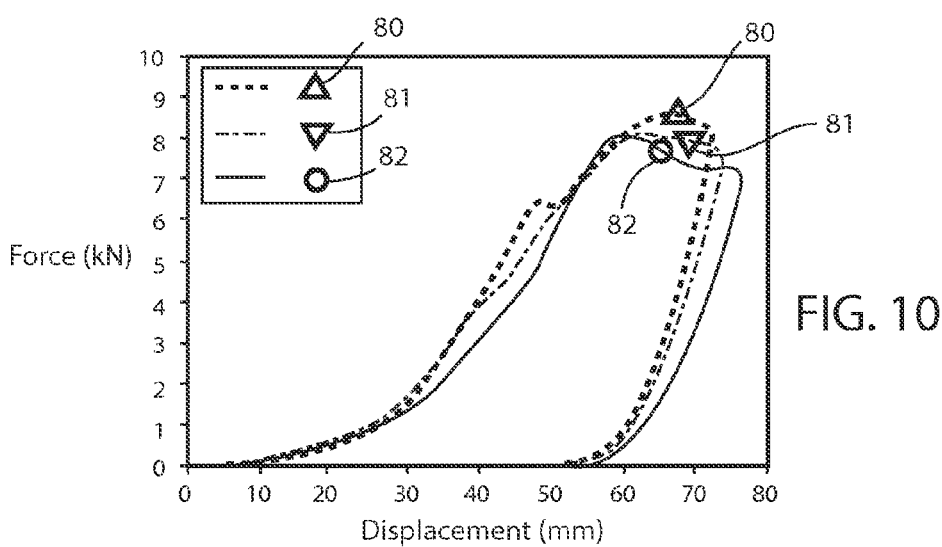
FIG. 10

BUMPER SYSTEM WITH PEDESTRIAN-FRIENDLY LOWER APRON

This application claims benefit under 35 USC section 119 (e) of application Ser. No. 61/810,851, filed Apr. 11, 2013, entitled BUMPER SYSTEM WITH PEDESTRIAN-FRIENDLY LOWER APRON and of application Ser. No. 61/924,979, filed Jan. 8, 2014, entitled BUMPER SYSTEM WITH PEDESTRIAN-FRIENDLY LOWER APRON, the entire contents of both of which are incorporated herein in their entirety.

BACKGROUND

The present invention relates bumper systems designed for pedestrian safety, and more particularly to a bumper system with lower apron designed with specific features to reduce "apron caused" pedestrian leg injury during an impact, and also that is particularly designed to work in conjunction with an adjacent primary bumper system for optimal "coordinated" impact resistance (i.e. where the primary bumper system and apron combine to form a coordinated "complete" bumper system designed for reduced pedestrian leg injury).

Traditionally, bumper systems are designed to protect a vehicle and its occupants. Recently, vehicle manufacturers of passenger vehicles are designing vehicles for improved pedestrian safety. As vehicle designers began to consider pedestrian safety, the bumper systems were often designed to provide a "softer" initial impact (such as to produce a lower force of resistance during a first few centimeters of impact stroke) and/or were designed to cause the pedestrian to roll onto the vehicle's hood during an impact. However, improvements are desired to further reduce pedestrian injury.

Lower aprons below a primary bumper beam have been used in an attempt to reduce pedestrian leg injury. However, conflicting requirements make design of any such lower apron difficult. For example, the lower apron should preferably be sufficiently stiff to help prevent a pedestrian from being drawn under the vehicle during an impact. At the same time (using traditional thinking), the apron potentially should not be so strong as to unnecessarily injure the pedestrian upon impact from the apron itself. The apron must be strong enough and durable enough to avoid being unacceptably damaged and/or destroyed by contact with curbs and other low obstacles often encountered by a vehicle. Yet, the apron must not be so rigid and heavy/structural that it becomes damaged (or causes vehicle damage) upon impacting a road-level object, and also it must not add an unacceptable amount of weight to the vehicle, particularly in view of vehicle weight and mpg requirements and goals, keeping in mind that any mass located ahead of the front vehicle wheels can adversely affect vehicle stability and can have an amplified negative effect on vehicle stability and mpg.

SUMMARY OF THE PRESENT INVENTION

In one aspect of the present invention, an apron for a vehicle front end includes a unitary molded component having a front structure and a rear structure joined by an offset portion, the front structure and rear structures extending at rearward downward angles, and the offset portion extending at a rearward upward angle.

In a narrower form, the front structure, rear structure, and offset portion define a same vertical cross-sectional thickness along a front to rear direction, and also the angles and thickness are such that lines extending horizontally from front to rear stay entirely within an envelope defined by the apron's upper and lower surfaces.

In another aspect of the present invention, an apron for a vehicle front end includes a unitary molded component having a front structure and a rear structure joined by an offset portion, where the rear structure defines adjacent channels extending in a fore-aft direction, with the adjacent channels being alternatingly upwardly and downwardly open. The front structure has a constant fore-aft depth and extends a full width of the rear structure and defines a non-linear front edge. The channels of the rear structure each form high-impact-strength locations and low-impact-strength locations if impacted directly, but the front structure is configured to distribute stress uniformly into the rear structure regardless of which location is impacted.

In another aspect of the present invention, an apron for a vehicle front end comprises a unitary molded component having a front structure and a rear structure joined by an offset portion, the front structure and rear structures extending at rearward downward angles, and the offset portion extending at a rearward upward angle. The front and rear structures and offset portion include upper and lower surfaces defining a boundary having a wave shape, and wherein the front structure defines a front edge with a tip that extends a full width of the front structure, and where lines extending horizontally rearward from the tip lie entirely within the boundary.

In another aspect of the present invention, an apron comprises a unitary molded component having a front structure and a rear structure joined by an offset portion, the front structure and rear structures extending at rearward downward angles, and the offset portion extending at a rearward upward angle. The front structure includes a front end having a lowest point and the rear structure includes a highest point, and wherein the offset includes material connecting the lowest point to the highest point. A step height is defined by the distance between the lowest point and the highest point, and wherein the rear structure includes columns having a beam vertical dimension, and wherein a ratio of the step height to beam vertical dimension is 125% to 300%.

In another aspect of the present invention, an apron for a vehicle front end under a primary bumper beam comprises a unitary molded component having a front structure and a rear structure joined by an offset portion, the front structure and rear structures extending at rearward downward angles, and the offset portion extending at a rearward upward angle, wherein the front structure includes a front end with a tip and has a front fore-aft dimension; and wherein the apron has a centerline defining a total fore-aft dimension, and wherein the front fore-aft dimension as a ratio with the total fore-aft dimension is within a range of between 5% and 75%. In a narrower aspect, the range is between 15%-25% %.

In another aspect of the present invention, a vehicle system includes a vehicle front end, a primary bumper system including a bumper reinforcement beam and a polymeric energy absorber on a face of the beam, and an apron extending generally horizontally and supported on the vehicle front end at a location spaced below the primary bumper system. The polymeric energy absorber and the apron have structure that, when impacted against a pedestrian leg, define force deflection curves having a same shape.

In another aspect of the present invention, a vehicle system includes a vehicle front end, a primary bumper system including a bumper reinforcement beam and a polymeric energy absorber on a face of the beam, and an apron extending generally horizontally and supported on the vehicle front end at a location spaced below the primary bumper system. The polymeric energy absorber and the apron include faces defining a vertical structure where a pedestrian leg is impacted substantially simultaneously by both faces during an impact, and where the apron, when impacted against the pedestrian leg, generates a force deflection curve that continues to rise during at least 90% of an impact stroke of at least 50 cm.

In another aspect of the present invention, a method of designing a vehicle system comprising steps of providing a vehicle front end including a primary bumper system with a bumper reinforcement beam and a polymeric energy absorber on a face of the beam, the energy absorber having a first force-deflection curve when impacted by a pedestrian-leg-simulating test device, designing an apron to have a second force-deflection curve that, when impacted by the pedestrian-leg-simulating test device, has a same shape as the first force-deflection curve, attaching the apron to the vehicle front end below the primary bumper system, and impacting the polymeric energy absorber and the apron against a pedestrian-leg-simulating test device to determine leg injury characteristics.

An object of the present invention is to provide an apron with transitional (offset) zone used to intentionally facilitate buckling at predetermined location(s) upon impact, but which allows for consistent and predictable load levels, and that promotes kinematics which prevent the forward portion of the apron from unacceptably lifting when impacted (and thus avoiding a primary cause of poor performance found in generally straight baseline aprons that include upward).

An object of the present invention is to provide an apron with front structure that mitigates apron lift during an impact, while also promoting columnar crush in the impact direction upon full stroke impact.

An object of the present invention is to provide an apron having a columnar structure able to maintain its columns for good initial impact strength while also providing a structure that promotes predictable and high energy absorption upon a full stroke impact.

An object of the present invention is to provide an apron with an upward inclination so that it will tend to ride up and over a low road obstacle such as a curb or other debris, yet that provides an optimal horizontal position and horizontal impact characteristics best suited for best pedestrian safety.

These and other aspects, objects, and features of the present invention will be understood and appreciated by those skilled in the art upon studying the following specification, claims, and appended drawings.

BRIEF DESCRIPTION OF DRAWINGS

FIG. 7 is a perspective view showing the present innovative apron of FIG. 1, where a homogeneous front structure is provided along a complete width of the front/leading edge of the apron ahead of the fore-aft columns in the apron's offset section and rear structure.

FIG. 7A is a top view of FIG. 7.

FIGS. 8-9 are fore-aft cross-sections taken along lines VIII and IX in FIG. 7A, which locations are drawn for comparison to FIGS. 4-5.

FIG. 10 is a force-deflection graph showing energy absorption profiles when leg impact occurs at specific locations on the apron of FIG. 7A, with each energy absorption profile being surprisingly similar to other energy absorption profiles regardless of a location of a leg's impact.

DETAILED DESCRIPTION OF PREFERRED EMBODIMENTS

Figure 1:
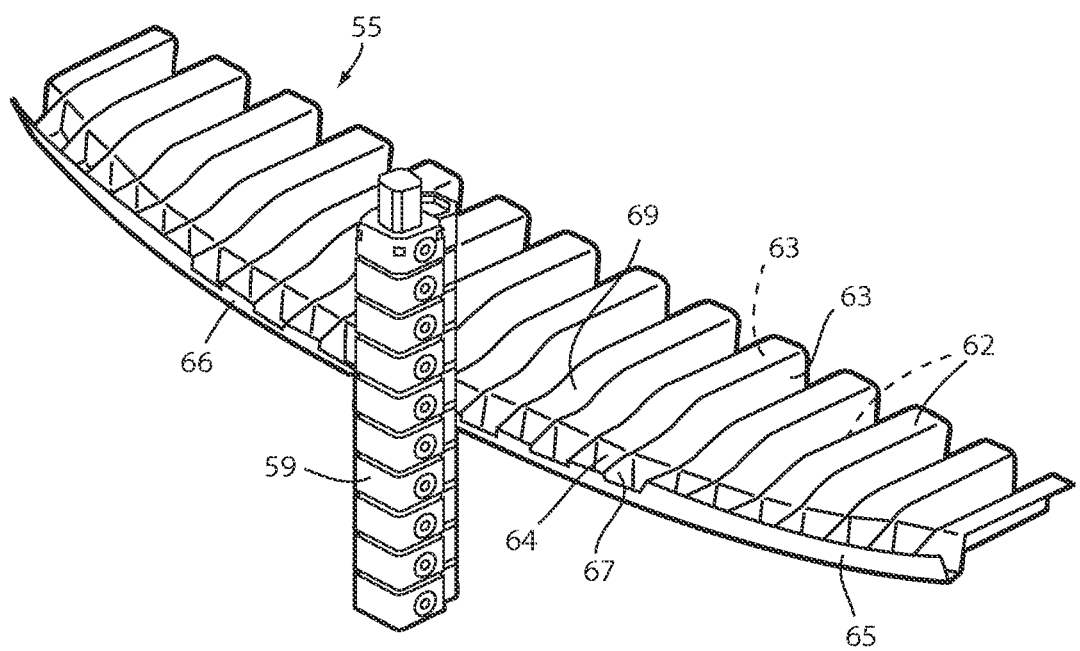
FIG. 1 is a side perspective view showing a below-bumper apron impacting a pedestrian-leg-simulating impact test device (called "FLEX PLI" pedestrian legform).
Figure 2:
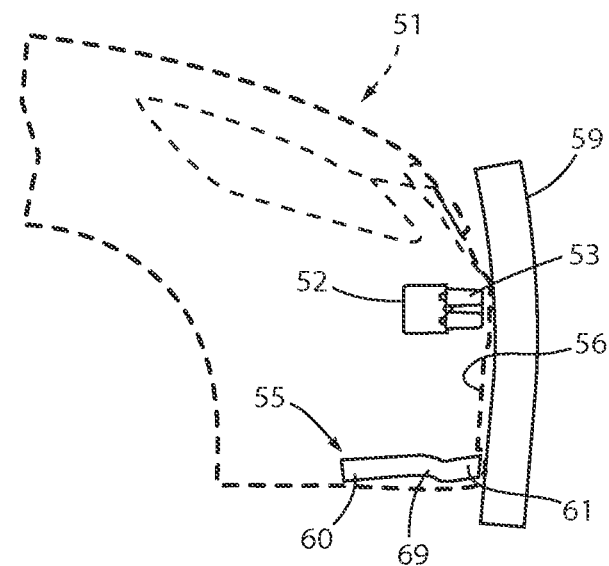
FIG. 2 is a side view of a vehicle front end including a primary bumper system (i.e. the reinforcement beam with polymeric energy absorber on its face) and a polymeric apron, impacting the impact test device of FIG. 1.

The present invention focuses on an apron 55 (FIG. 1) in a vehicle front end 51 (FIG. 2), the apron 55 being spaced below the vehicle's primary bumper system 52/53. The apron 55 is tuned with the primary bumper 52/53 system to minimize pedestrian leg injury upon an impact. Notably, impact data provided herein was generated using a FLEX PLI leg-form impact test device 59, as described hereafter, which is an impact test device recently developed that provides improved and more accurate data on pedestrian leg injuries from vehicle impacts.

The present innovative apron 55 includes a corrugated energy-absorbing rear structure 60 (described as alternating channels below) and a "homogeneous" front structure 61 joined by an intermediate offset portion 69 to the rear structure 60. The structures 60, 69, and 61 form a wave shaped envelope when viewed from a side (in a vehicle mounted position) (see FIGS. 2, 11-12). The illustrated wave-shaped apron 55 provides very desirable (stiff) resistance to impact during an initial impact stroke, but crumples and crushes in an optimal way for good energy absorption as the impact stroke continues to completion. Specifically, the present apron 55 is designed to provide energy absorption that is predictable and consistent, with the apron also being structurally robust and durable for long-lasting product quality on the vehicle (i.e. outside of when impacted by a pedestrian's leg). Also, the present apron 55 is designed to cooperate with the primary bumper system 52/53 to provide an overall "complete" bumper system designed to provide reduced pedestrian leg injury during a vehicle impact.

The illustrated energy-absorbing rear structure 60 (FIG. 7-9) is formed by upper and lower horizontal walls 62 interconnected by vertical walls 63 to form a plurality of adjacent/alternating parallel channels. Specifically, the walls 62-63 combine to define a plurality of fore-aft-extending columns that form alternating up-facing and down-facing open channels (i.e. a "corrugated shape") across a width of the apron 55. Notably, the illustrated channels are foreshortened so as to match an aerodynamic curved front end of the vehicle front end 51.

The homogeneous front structure 61 (FIGS. 7-9) is defined by a zone of uniform-impact-resisting structure (e.g. 1-4 inches deep in a fore-aft direction, or more preferably about 2-3 inches deep). The front structure 61 extends across a width of the apron 55, and in particular extends laterally across the apron's leading edge in front of the rear structure 60 and of the offset portion 69. It is noted that the front edge of the apron 55 is curved to match a vehicle's front end, and as a result the outermost ends of the front structure 61 may (or may not) curve into the offset portion 69, potentially eliminating part or all of the offset portion 69 at the outboard ends of the apron 55 (see FIGS. 1 and 2).

The illustrated homogeneous front structure 61 (FIGS. 7-9) includes a curvi-linear front wall 65 (curved vertically and also curved side-to-side on the vehicle). The wall 65 forms a forward most tip 66 (also called an "edge" herein) of the apron 55, with the tip 66 being designed to be a first point of contact with a pedestrian's leg. A wall 64A extends parallel the tip 66 between the tip 66 and the wall 64. Notably, the tip 66 extends a full-width of the apron 55. The wall 65 is curved downwardly and rearwardly from the tip 66, such that it forms a stress-distributing "soft nose" or "softening stress-distributing" zone during an initial impact. A plurality of fore-aft extending vertical flanges 67 (each being illustrated as aligned with a vertical wall 64 in the rear structure 60, but which are not necessarily aligned) extend from the wall 64A and the tip 66. The side-to-side laterally-extending vertical flange 64A is spaced rearwardly from the front tip 66 by about 1-2 inches and extends generally parallel to the front tip 66. The flanges 64, 64A and 65 interconnect and stabilize the front wall 65, thus providing stability to the front section in a manner providing homogeneity of impact resistance upon impact regardless of a specific location of impact. The illustrated side-to-side vertical flange 64A has end portions that ride up on the up-turned offset part 69 of the wave shape, but it is contemplated that the flange 64A could be entirely located ahead of the offset part 69 if desired. It is contemplated that a thickness of the flanges 64, 64A and 65 can be varied as needed for improved stress distribution (i.e. varied to eliminate any "hot spots" where stress might be distributed through the front structure 61 to the offset and rear structures 69 and 60.

Figure 3:
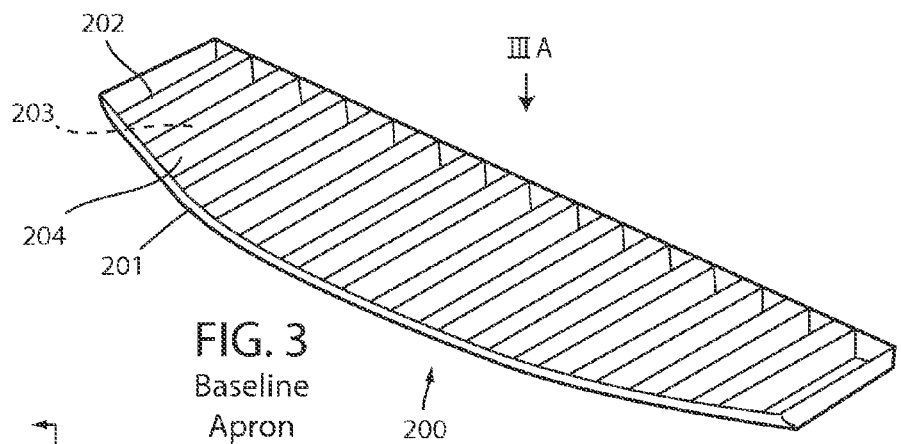
FIG. 3 is a perspective view showing a traditionally-designed apron that is not in prior art, but that illustrates an apron (called "baseline apron") designed using "traditional thinking", where fore-aft columns in the apron extend to a front edge of the traditionally-designed apron.
Figure 3A:
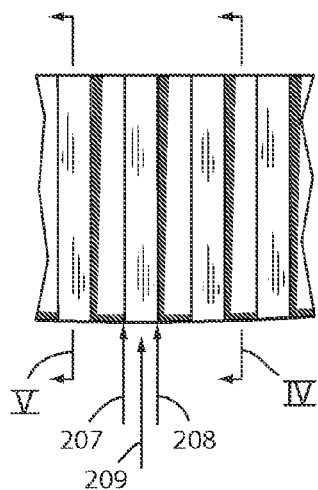
FIG. 3A is a top view of FIG. 3.
Figure 4:
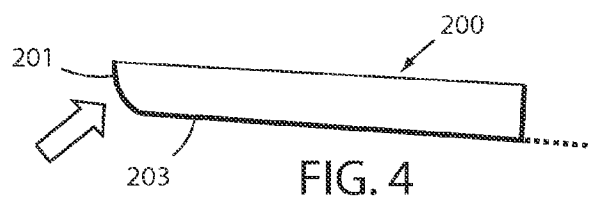
FIGS. 4-5 are fore-aft cross-sections taken along lines IV and V in FIG. 3A.
Figure 5:
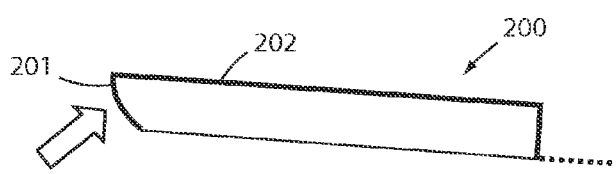
Figure 6:
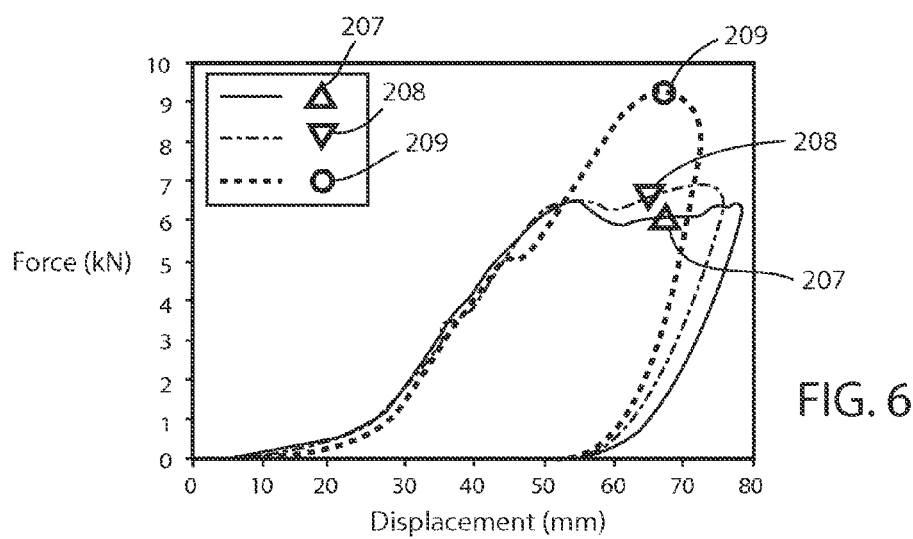
FIG. 6 is a force-deflection graph showing energy absorption profiles when leg impact occurs at specific locations on the apron of FIG. 3A.
Figure 17:
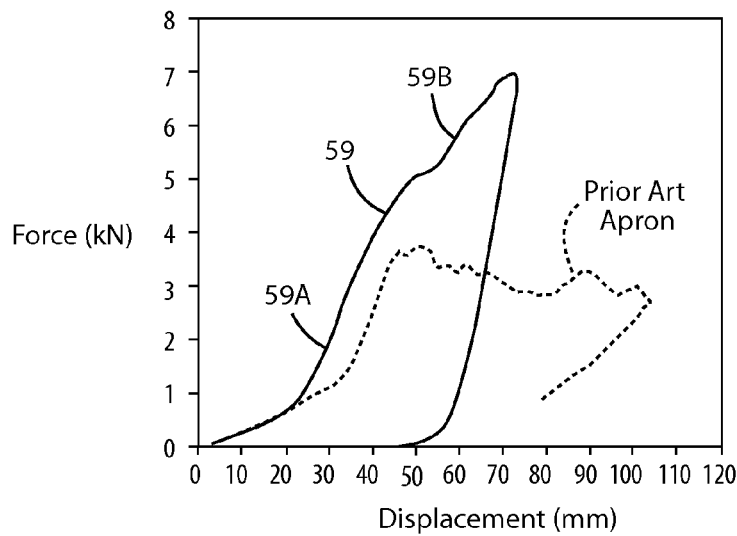
FIG. 17 is a graph showing force-displacement curves of the present innovative apron from FIG. 14 (and from FIGS. 1-2) and comparing same with a curve from a known prior art apron.
Figure 18:
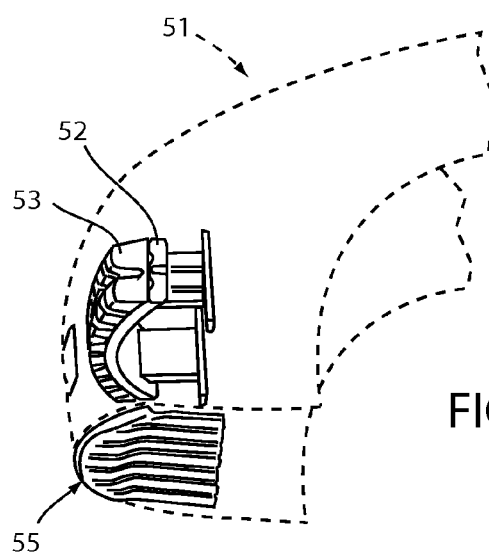
FIGS. 18-19 are side perspective and top views of FIG. 14.

The homogeneous front structure 61 is designed to provide a relatively uniform and controlled initial impact against a pedestrian's leg during a first 2-4 inches of impact stroke, regardless of a particular location on impact where the pedestrian's leg strikes the apron 55. (Compare FIG. 10, which shows uniformity of impact resistance regardless of a particular leg impact location, as compared to FIG. 6, which shows non-uniform impact resistance, with impact resistance being sensitive to a particular location of impact on the apron. FIG. 6 was generated by impacting a "baseline apron" 200 as shown in FIGS. 3-5 created using "traditional thinking", as described below). The front structure 61 of the present innovative apron 55 also provides a more uniform and predictable energy absorption during a full length of the impact stroke due to the way it spreads stress from the "point" of impact at the front edge across a broader area into the rear structure during an impact. (See FIGS. 10 and 15 and 17). Notably, during a continued impact stroke (i.e. after the initial contact), the homogeneous front structure 61 causes the multiple walls of the columns of the rear structure 60 to crumple and collapse with a widespread and denser array of energy-absorbing multi-location folding of wall material, thus leading to a more predictable and higher energy absorption.

Notably, the more fold points of walls 62-63 during an impact, the greater the energy absorption during an impact. Significantly, the unique horizontally-non-planar "wave shape" of the present apron 55 gives the apron 55 high initial fore-aft longitudinal strength, which helps it ride up and over curbs and many road obstructions. Also, the upward angle (i.e. relative to a vehicle moving forwardly) of the front structure 61 helps the apron 55 ride up and over obstructions on a road. Yet, the apron 55 has good columnar crumpling/crush during an impact stroke (i.e. the "widespread dense energy-absorbing folding"). This combination of features is because the illustrated shape of the columns tends to maintain sufficient longitudinal integrity to provide good initial fore-aft impact resistance before collapse, but then causes the rear structure 60 to crumple and undergo multiple dense folding (i.e. high energy absorption). This type of multi-fold high energy absorbing collapse is much more preferable than a catastrophic collapse with relatively few folds, since few folds results in low energy absorption, and also makes it more difficult to predict the timing of the collapse. Thus, the present apron 55 design leads to the more uniform and predictable and high energy absorption than in known aprons.

As noted above, the illustrated vehicle front end 51 (FIG. 2) includes a primary bumper system comprising a bumper reinforcement beam 52 and a polymeric energy absorber 53 engaging a face of the beam 52. The polymeric energy absorber 53 can be any of many different such devices known in the industry, but the illustrated energy absorber 53 includes a plurality of hollow crush that crush upon impact to absorb energy in a predictable and non-catastrophic manner. The bumper system further includes the apron 55 (FIGS. 1-2) that extends generally horizontally and that is supported on the vehicle front end 51 at a location spaced below the primary bumper system. A fascia 56 aesthetically covers the vehicle front end 51, including the primary bumper system (i.e. bumper reinforcement beam and polymeric energy absorber on its front surface). The fascia 56 may or may not cover the apron 55. Where the fascia 56 (FIG. 2) is supported by the beam 52 and the energy absorber 53 and the apron 55, it helps distribute stress from an impact into the front structure of the apron 55 and in turn into the rear structure 60 of the apron 55. In some circumstances, the fascia 56 may eliminate (or partially eliminate) the need from the apron's front flange 65. Where the fascia 56 does not fully cover the tip 56 of the apron 55, the front wall 65 by itself can be designed to provide the stress-distributing function.

Persons skilled in this art will understand that pedestrian leg injury is difficult to measure, and for the reader's benefit it is noted that the data herein was generated using a recently developed legform 59 (called "FLEX PLI" legform herein) used for simulating leg injury. The FLEX PLI legform 59 is now being recommended by many standard-setting government and insurance industry agencies, and will be well known by persons skilled in this art, such that a detailed explanation of it is not necessary. Notably, the FLEX PLI legform 59 has sensors and is adapted for generating data based primarily on bending. It generally has a superior correlation to an actual human leg (i.e. it is more "biofidelic") over previous standardized leg impact test devices.

The apron 55 defines an optimal force deflection curve (FIG. 10) where a force of resistance to the impacted pedestrian leg rises rapidly during a first few centimeters of impact stroke (regardless of a location of the impact), and a second portion that continues to maintain a significant force of resistance during the (continued) impact stroke (before catastrophic failure and collapse of the apron). The present apron 55 is advantageously designed to provide a similar force-deflection curve regardless of a location of the impact. For example, impacts at locations 80-82 on apron 55 all provide very similar force-deflection curve regardless of a particular impact location. Contrastingly, the baseline apron 200 provided inconsistent impact results when impacted at locations 207-209 (FIG. 6). Notably, it is not easy to accomplish a same impact resistance at different impact locations on the apron 55, yet this result is important to providing a system most likely to avoid (or minimize) injury to a pedestrian's leg. By providing a consistent homogeneous front structure, the illustrated apron 55 is able to provide a result where all impact locations of the apron 55 provide optimal test results. Restated, this consistent homogeneous front structure avoids the situation where some impact locations of the apron pass testing, while other impact locations of the apron fail.

Specifically, in FIG. 10, the impact identified as line 80 was directly against the apron at a location directly in-line with one of the vertical walls 63, 64 in the channels of the apron 55 (near a center of the apron). In this impact location, the single wall (in combination with adjacent horizontal walls) is what generates most of the primary force of resistance shown in line 80. The impact identified as line 81 was also directed in-line with one of the adjacent vertical walls (with this wall being immediately adjacent the wall tested to generate impact line 80). Thus, this second (single) wall is what generated most of the primary force of resistance shown in line 81. The impact identified as line 82 was directed to an impact location half-way between the above two walls. Due to a width of the legform test device 59 (i.e. due to a width of a typical pedestrian's leg), this causes both of the two adjacent vertical walls to generate the force shown in line 82. As shown in FIG. 10, the lines 80-82 are a same (or very similar) shape. This consistent impact resistance provides better control of leg injury, regardless of where impact occurs, since the same force of impact resistance is experienced in all locations on the apron.

To establish a baseline, an apron 200 (called a "baseline apron", FIGS. 3-5) was developed using "traditional thinking" and then tested. The apron 200 includes a front edge formed by a full-width curved flange 201 along its leading edge and a plurality of corrugations formed by horizontal high walls 202, horizontal low walls 203, and vertical joining walls 204 that define alternating up and down facing channels (FIGS. 3-5). The walls 202-204 extend from the front curved flange 201 to a rear of the part. Our testing (FIG. 6) suggests that the apron 200 provides inconsistent energy absorption upon impact, where the kN of resistance to impact varied by as much as 12% or more, depending on where a pedestrian's leg impacts the apron.

Specifically, if the illustrated apron (200) (FIGS. 3-5) was impacted at its "weakest" impact point (e.g. impacted at locations centered on the vertical walls forming parts of the fore-aft channels in the apron 200 near a center region of the apron), it had a maximum impact strength (see FIG. 6) of about 6.5 to 7 kN (see lines 207, 208 in FIG. 6) (using a FLEX PLI legform impact test device 59 to simulate a pedestrian leg). Contrastingly, the maximum impact strength was over 9 kN (see line 209) if the apron 200 was impacted at its "strongest" impact point. This is an inconsistency of impact energy absorption of over 25% (i.e. 9 kN divided by 7 kN) at the peak resistance to impact. It is noted that the illustrated "traditionally designed" structure does not represent prior art, since it only represents an attempt to generate baseline data based on typical parameters and design approaches used in designing a bumper apron system, as best understood.

Contrastingly, in an apron (55) designed according to the present innovation (see FIGS. 7-9), the channels do not extend completely to a front edge of the part. Instead, the apron 55 includes a homogeneous front structure 61 that distributes forces more widely and uniformly into the rear structure 60 (i.e. into the alternating up/down facing channels). It is noted that the darker line in FIGS. 8-9 illustrate a wall 63 extending out of the page toward the reader, while a lighter line illustrates an adjacent wall 63 extending into the page away from the reader. Testing shows that the illustrated design of front structure 61 in combination with the rear structure 60 (including walls 62, 63, 64) provides an impact resistance that is much less sensitive to the location of impact. For example, the illustrated apron 55 (FIGS. 7-9) had a maximum impact strength (see FIG. 10) of about 8 to 8.5 kN if impacted by a FLEX PLI legform impact test device (i.e. if impacted by a pedestrian leg) at locations centered on the horizontal walls forming parts of the fore-aft channels in the apron 55 (see lines 80, 81 in FIG. 10), while the maximum impact strength was only 8.0 kN (see line 82) if impacted directly in-line with one of the vertical walls forming the channels in the apron. This is an inconsistency of impact energy absorption by less than about 7% (i.e. 8.5 kN divided by 8 kN) at the peak resistance to impact.

Figure 11:
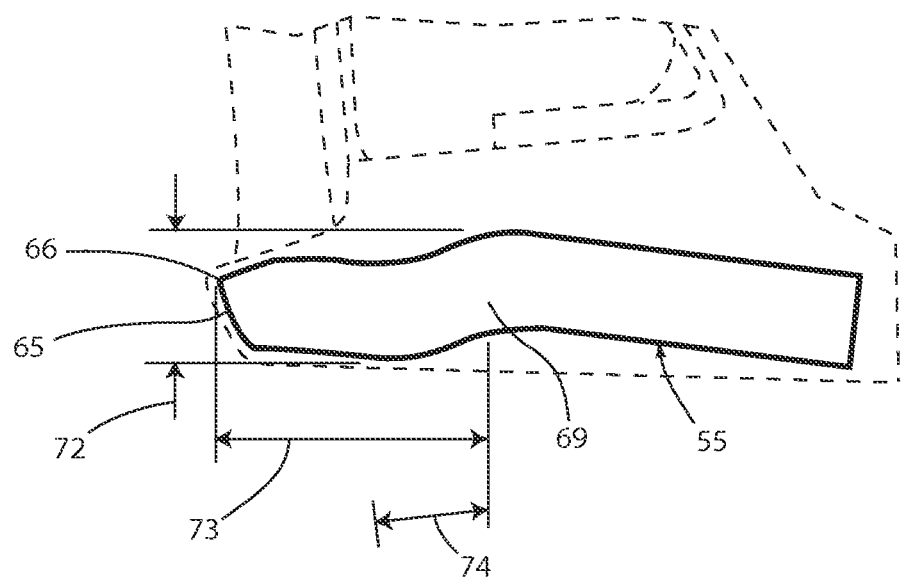
FIGS. 11-12 are cross sections taken along a fore-aft direction in FIG. 1 near a center thereof, illustrating a shape of the "envelope" of the present innovative apron.
Figure 12:
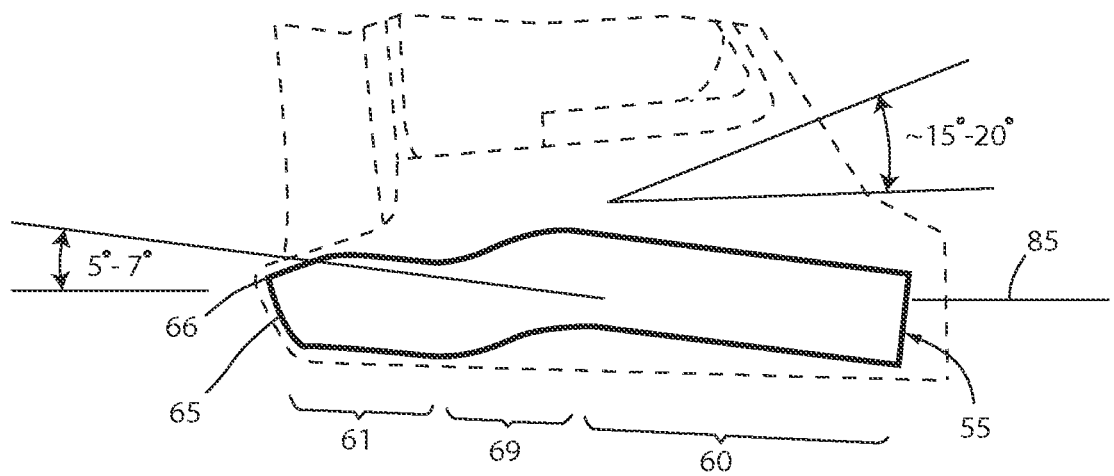

FIGS. 11-12 illustrate details of the "wave shape" in the apron 55, both in terms of a step height 72 of the offset part 69 (also called a "step" herein), a fore-aft location 73 of the offset part 69, and a longitudinal length 74 of the offset part 69. It is contemplated that a fore-aft location of the offset part 69 at a horizontal center of a width of the apron 55 can be about 20%-40% of the apron's full length from the front edge 69, or more preferably is about 25%-30% of the apron's full length (as measured in a fore-aft direction). The step height 72 is measured by the distance from a lowest portion of the apron's front edge 66 to a highest point of the offset part 69 (see FIG. 11) (the highest point typically occurring at a rearmost location of the offset part 69). The front structure 61 (FIG. 12) extends at a downward angle from horizontal such as about a 5 to 8 degree angle (when in a vehicle-mounted position). The illustrated offset part 66 begins at a lowest point on the apron 55 and then extends upwardly at an angle of about 15 to 20 degrees to a highest location. The rear structure 60 then extends from this highest location at a 5-8 degree angle downwardly to a rear most edge of the apron 55. Notably, the downward angle of the illustrated front structure 61 and rear structure 60 are generally parallel. (See FIG. 12).

The tip 66 of the front edge of the apron's front wall 65 is preferably located so that a line (i.e. see horizontal plane 85, FIG. 12) extending from the tip horizontally-rearwardly is contained entirely within the 3D boundary of the continuous profile of material defined by the apron 55. By the phrase "3D boundary", we refer to an envelope of space that is defined by the upper and lower surfaces of the apron 55, which generates a "wave" shape as one follows the front structure 61 into the offset 69 and into the rear structure 60. (See FIGS. 11-12). It is significant that the tip 66 of the front wall 65 is aligned within the 3D boundary since an impact will therefore primarily generate forces that are within the structural integrity of the columnar strength of the structures 60, 69, 61. Restated, if the tip 66 of the front wall 65 was outside the 3D boundary at any point of the boundary, an impact would tend to cause the apron 55 to more quickly buckle and catastrophically collapse . . . thus causing an earlier catastrophic collapse in the impact stroke . . . and also causing fewer folds and less energy absorption during an impact stroke. This is because impact forces occurring outside of the boundary would place substantial bending loads on the apron 55.

Specifically, when the present innovative apron 55 (FIG. 11-12) is impacted, the impact forces are transmitted substantially horizontally from the tip through the front structure 61 and through the offset part 69 into the rear structure 60. By having the tip located within the continuous-material boundary of the apron, bending forces on the apron 55 are minimized and concurrently, the columnar beam strength is maintained longer during an impact stroke. Thus, the beam of the apron 55 is not required to have as much bending strength to keep the beam of the apron 55 from "kinking". This fact in turn allows the apron to be designed as a lighter-weight part. Restated, by having the tip within the continuous-material boundary of the apron, the apron has better internal strength that resists premature bending, yet it concurrently causes the channels of the apron 55 to crush and crumple in a predictable manner causing multiple and dense folding (which results in high energy absorption during the crush stroke). This apron design also results in a longitudinal structure better able to withstand low obstacle forces in the environment, such as curbs, parking cement structures, and the like.

Figure 13A:
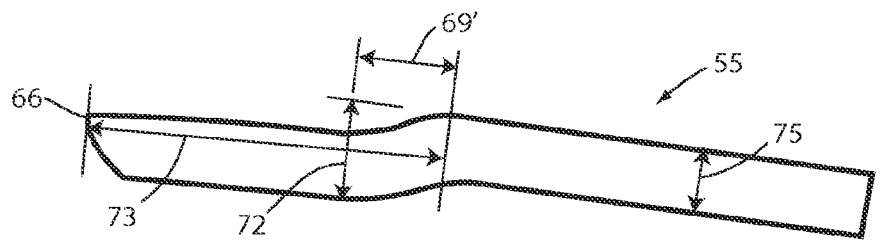
FIGS. 13A-13F are cross-sections of aprons similar to FIGS. 11-12, but modified to have different vertical step heights located at different longitudinal step locations.
Figure 13B:
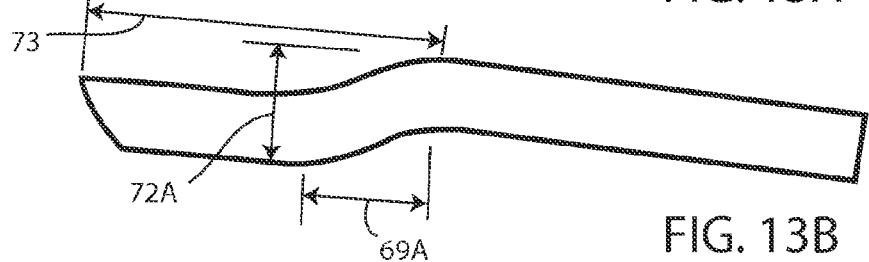
Figure 13C:
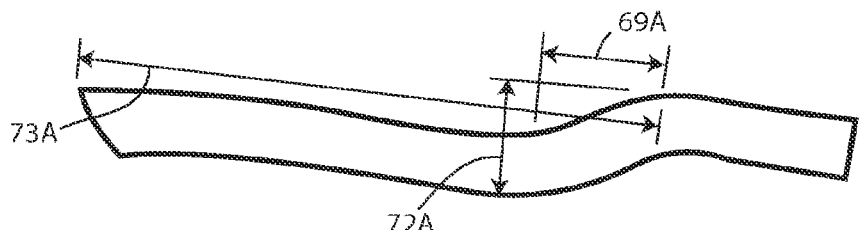
Figure 13D:
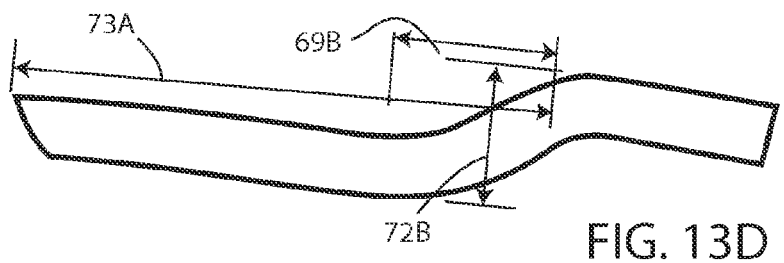
Figure 13E:
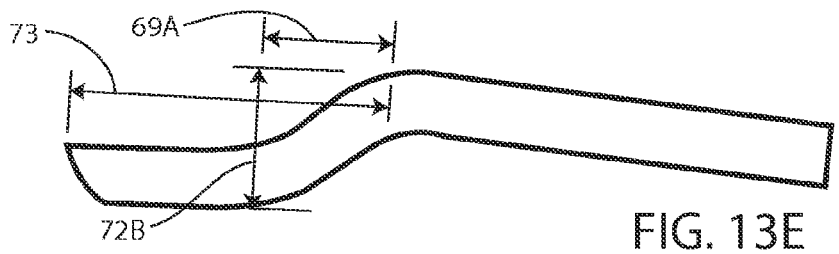
Figure 13F:
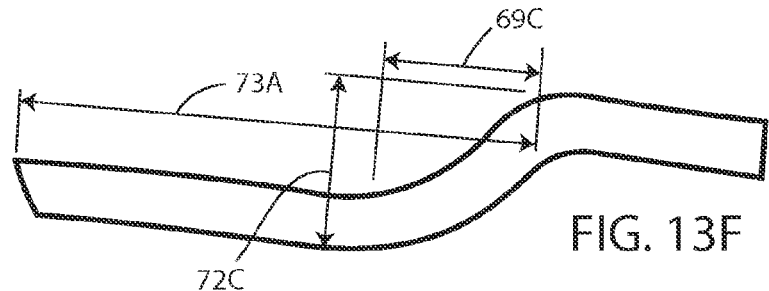
Figure 14:
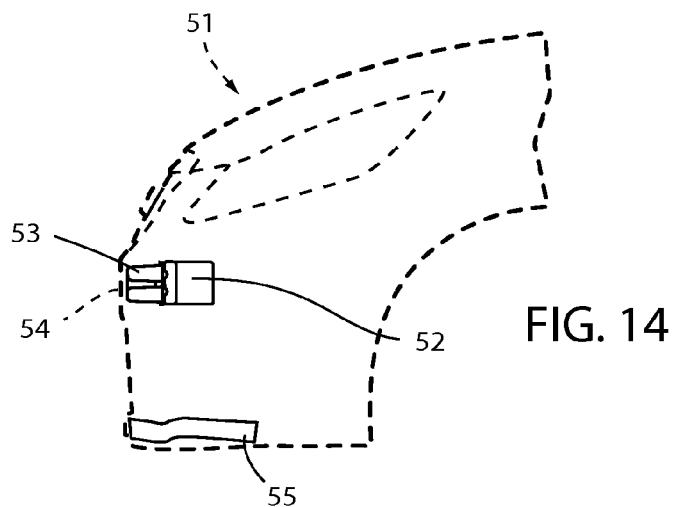
FIG. 14 is a side view of a vehicle front end with primary bumper system (i.e. reinforcement beam and energy absorber on its face) and an apron, similar to that shown in FIG. 2, but not showing a FLEX PLI leg impact test device.

FIGS. 13A-13B illustrate a preferred apron 55. However, FIGS. 13A-13F illustrate variations contemplated to be within a scope of the present invention. It is noted that each apron 55 in FIGS. 13A-13F includes a continuous vertical thickness (called vertical beam dimension) that is relatively constant. In FIG. 13A, a step location 73 is located at a rear edge of the offset portion 69. The offset portion 69 has a length dimension 69'. The apron 55 includes a step location 73 (i.e. the distance from a front tip 66 of the apron 55 to a rear of the step) that is about ⅓ of the distance from the front tip 66 to a rearmost edge of the apron 55. In FIG. 13A, the step height 72 (i.e. the distance of the step from a bottommost surface on the front structure 60 to a top surface on the rear structure 61 of the apron 55) is only about 125% to 150% of a continuous vertical thickness dimension 75 of the apron 55. The FIGS. 13A-13F illustrate that the step location can be any of 73-73A, and that the offset's length dimension can be any of 69', 69A-69C. The FIGS. 13A-13F illustrate that the step height can be any of dimensions 72-72C. It will be understood by persons skilled in this art that the particular locations and ratios noted above can be manipulated to provide particular impact characteristics and function for a particular bumper system (such as energy absorption, force-deflection curves).

Specifically, the apron 55 in FIG. 13A has a step length of 69', a step height of 72, and a step location of 73. The apron in FIG. 13B has a step length of 69A, a step height of 72A, and a step location of 73. The apron in FIG. 13C has a step length of 69A, a step height of 72A, and a step location of 73A. The apron in FIG. 13D has a step length of 69B, a step height of 72B, and a step location of 73A. The apron in FIG. 13E has a step length of 69A, a step height of 72B, and a step location of 73. The apron in FIG. 13F has a step length of 69C, a step height of 72C, and a step location of 73A. For example, step height 72A may be 50% greater than step height 72, while step height 72B is about double and step height 72C is about triple the step height 72. Also, step length 69A is about 50% greater than step length 69', while step length 69B is about double, but step length 69C is only about 80% greater. Step location 73 is in a zone within a front 10%-40% of the apron 55, while step location 73A is in a zone within a rear 10%-40% of the apron 55. It can be seen that a variety of different combinations of dimensions can be used to construct a particular apron using the present innovative technology.

The present innovative apron includes several advantages over known prior art aprons. Specifically, the present apron 55 provides an efficient energy-absorbing system, due in part because it is designed to provide a significant and surprisingly high impact energy absorption used in a manner to promote optimal pedestrian leg safety (i.e. reduced leg injury). Also, the present apron distributes impact forces over a greater horizontal area on the pedestrian's impacted leg (due to the front structure 61), and also distributes impact forces more uniformly into the columnar rear structure 60, as explained above, thus causing an apron 55 that handles stress better than known aprons. Notably, the present apron 55 is designed to act in coordination with an existing high-strength bumper system 53/54, such as by being sufficiently strong to provide a minimized amount of bending of the pedestrian's leg during impact (keeping in mind that the pedestrian's leg is being impacted simultaneously by the primary bumper system and the apron).

Also, the benefits of using an efficient energy absorbing system are due in part to the "nose" of the apron 55 maintaining its vertical position (i.e. not bending upwardly) during an impact. In addition to keeping the apron 55 in a horizontal position for optimal crush and hence energy absorption, this continued-horizontal position of the apron 55 also maintains (or increases) tension on the fascia 56 during a leg impact, thus providing still greater surface area engaging the pedestrian's leg, thus still further reducing injury. Also, is it beneficial to have a relatively vertically-faced vehicle front end 51 with strong apron 55, so that a front-directed impact keeps a pedestrian's body generally upright and hence prevents a foot/ankle of the pedestrian from rolling under the vehicle (which would cause the foot/ankle to potentially become trapped on the pavement by the apron 55 and potentially lead to a pedestrian being drawn under the vehicle). At the same time the homogeneous front structure 61 can be better tuned in all potential impact locations across its front to provide an optimal force of resistance to impact, in order to minimize leg injury. It is noted that the present apron 55 keeps its "nose" in a relatively stable position on impact due in part to the fact that the tip 66 is positioned so that a horizontal line of impact stays within a boundary of the envelop of the apron 55, thus minimizing a tendency of the apron 55 to prematurely buckle during an initial impact stroke.

Our testing (based on testing using the FLEX PLI legform 61) suggests that a vehicle front end is optimally rather flat and vertical (referred to hereafter as a "flat vehicle front"). A reason for this is so that a pedestrian is simultaneously impacted by a nose section of the polymeric energy absorber on the primary bumper and by a nose section of the apron. This distributes impact loads over a greater surface area on the pedestrian's leg, but does tend to provide a higher and faster energy transfer into the pedestrian's leg due to the impact. Despite the higher and faster energy transfer into the pedestrian's leg, our testing surprisingly showed that a pedestrian tends to have a reduced amount of leg injury (based on testing using the FLEX PLI legform 61) when impacted by this "flat vehicle front".

Figure 16:
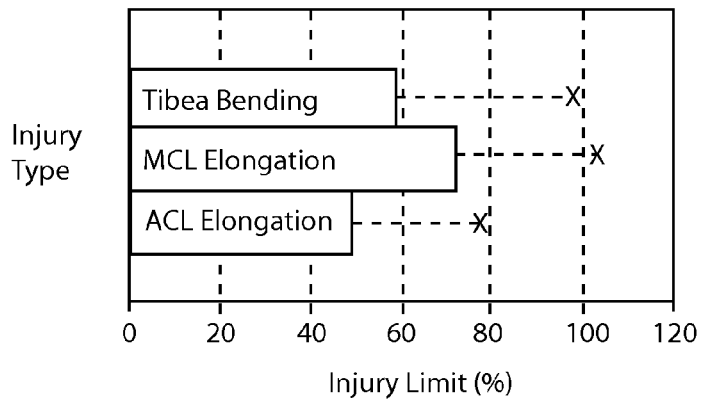
FIG. 16 is a chart showing improved pedestrian injury factors upon an impact against the present innovative total bumper system of FIGS. 1-2, with X points showing comparison impact results on a known existing prior art bumper system.

Part of the reason is believed to be associated with less twisting and torque on joints and internal bone and body parts of the pedestrian. Test results on the present system show that the present innovative system including the bumper energy absorber 53 and apron 54 had force deflection curves 58/59 that rose together surprisingly very rapidly during an initial force of resistance (58A/59A) during an impact stroke (e.g. during a first one or more centimeters of impact stroke). Testing also suggests that a maximum level of resistance force preferably continues to be maintained and/or continues to rise during a later portion 58B/59B of the force deflection curve during at least 90% of the useful impact stroke of the apron 55 and energy absorber 53/58B/59B. This results in less injury, as shown in FIG. 16. It is noted that FIG. 16 includes markers "X" that show baseline data achieved by testing the baseline apron 200 (see FIG. 3-5). While the apron 200 is not truly prior art, it is an attempt to show an apron using "traditional thinking" as described above.

The present system, including apron 55, provides a very rapid rise in force of resistance during initial impact, and further continues to rise during the full impact stroke. Our testing suggests to us that in the present innovative system, the force of resistance does not necessarily need to have an upper limit on the rapidness of the rise in its force of resistance. This is counterintuitive to most "current thinking" in our opinion, since "current thinking" tends to focus on an impact-receiving system providing a softer initial impact force of resistance to "catch" a person during an initial impact stroke (such as during a first couple inches of impact stroke against a pedestrian's leg). The present invention matches force-deflection curves of its energy absorber and apron. (Contrastingly, no known prior art system provides an apron that matches the force-deflection curve of a "mating" energy absorber or bumper reinforcement beam). The present invention does not limit a maximum resistance force of either the energy absorber or the apron. (Contrastingly, in known prior art systems, the bumper system and apron provide peak (maximum) resistance forces at different times).

As noted above and shown in FIG. 15, the polymeric energy absorber 53 and the apron 55 define force deflection curves 58 and 59 having similar shapes during an impact stroke against a pedestrian leg (represented by the FLEX PLI legform 61). Optimally, the force deflection curves 58 and 59 are similarly shaped, with each including a first portion 58A/59A where a force of resistance to the impacted pedestrian leg rises rapidly (as rapidly as possible given design constraints) during a first few centimeters of impact stroke, and a second portion 58B/59B that continues to rise during at least 90% of the useful impact stroke of the apron 55 and energy absorber 53.

Figure 15:
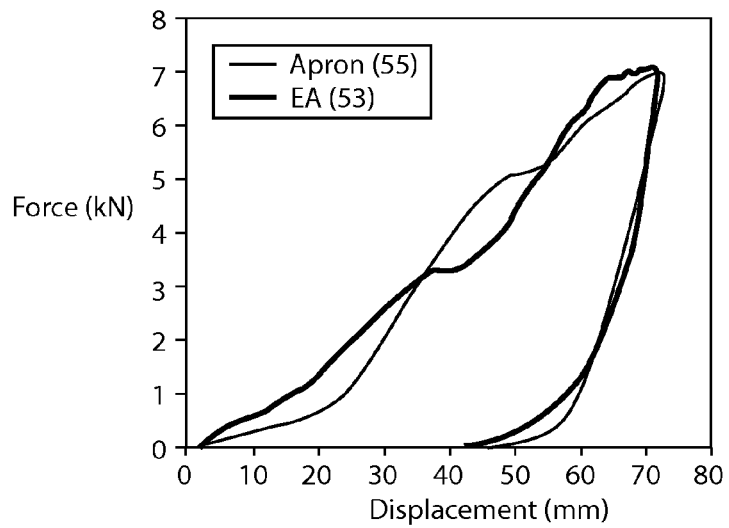
FIG. 15 is a graph showing force-displacement curves of an energy absorber and apron from FIG. 14 (and from FIGS. 1-2).

Specifically, FIG. 15 shows force deflection curves 58, 59 for both the primary bumper system (with bumper reinforcement beam 52 and energy absorber 53 with crush lobes 54 extending forward of a face of the beam 52) and the apron 55 (spaced below the beam 52 and supporting lower parts of the vehicle front fascia 56), where both the polymeric energy absorber 53 and apron 55 impact a pedestrian's leg close to simultaneously. The present innovative apron 55 (FIG. 2) provided improved/reduced injury results in: ACL elongation, MCL elongation, and tibia bending injuries. Notably, the present apron 55 was substantially lower in weight than many other apron systems, despite having a stronger force of resistance to impact (see FIG. 17) and providing better overall bumper system functionality. Notably, a lower weight of the apron 55 is particularly beneficial due to its forward location on the vehicle front end (and in particular due to it being ahead of the front tiers of the vehicle).

FIG. 15 is a graph showing the force-deflection curves for the present polymeric apron 55 embodying the present inventive concepts as compared against a competing apron in prior art. Notably, the present apron 55 is considerably stiffer than known prior art energy absorbers (i.e. the force-deflection curve of apron 55 rises much more steeply upon impact), such that the present apron 55 does a better job of maintaining a vertical position of the pedestrian's leg. This is the case even if a force-deflection curve of the individual apron 55 and bumper energy absorber 53 have different force deflection curves. However, it is particularly effective if the apron 55 and bumper energy absorber 53 are designed as a system to have similar force deflection curves. It is noted that historically, prior art bumper systems and aprons were designed with an upper limit for maximum force of resistance, which is consistent with historical thinking that pedestrian impacts required a softer initial impact force (i.e. a less steep rise in impact force of resistance) and an upper limit on maximum impact force of resistance. However, the present system is totally different from that thinking, in that the present system is designed with no upper limit for force of resistance for the apron. Further, the force of resistance for the present apron 55 is designed to rise as steeply as possible given design constraints.

Figure 19:
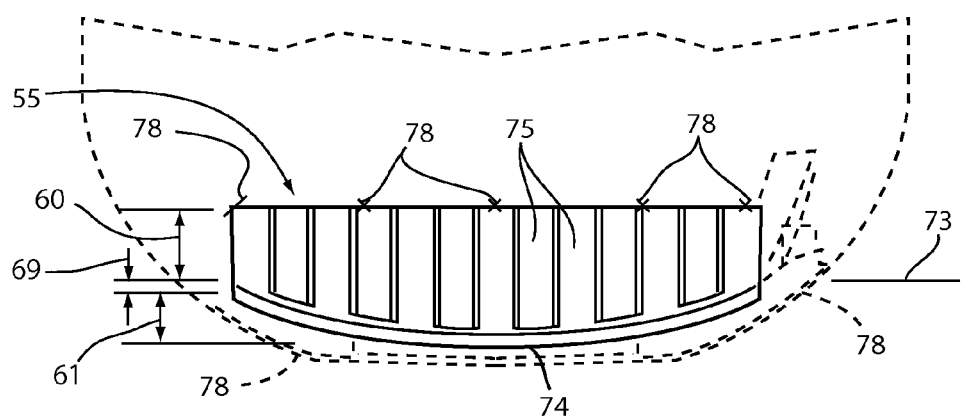

Our testing shows that the apron's wave shape (see FIGS. 11-12) in combination with the front and rear structures 61, 62 and offset 69, in combination with the fore-aft extending channels 75 causes the apron 55 to have sufficient structural integrity such that it can be mounted using relatively few vehicle attachment fasteners (such as only about 5-7 vehicle attachment fasteners or so, see locations 78, FIG. 19). A reason for this is because the apron 55 is sufficiently stiff to be easily handled (i.e. the part is not "floppy" nor excessively flexible) and that the apron 55 is sufficiently stiff once anchored to the vehicle in only a few locations. By the present configuration and geometry of the apron 55, our testing shows that the present apron 55 can be made of unreinforced polymer, such as unfilled polypropylene (having a specific gravity of 0.90, as opposed to traditional aprons that use a 30% glass filled polypropylene having a specific gravity of 1.15). The lack of fiber reinforcement can lead to better flex-back and memory in the apron 55, leading to be recovery of its original shape after an impact. The present shape/part-geometry in combination with an unreinforced polymer (which has a relatively lower specific gravity than a glass-filled reinforced polymer) leads to a weight savings of about 0.65 kg over a known similar apron, or in other words, about a 37% reduction in mass, as compared to a similarly shaped apron with similar volume of material. This is considered an extraordinary, surprising, and unexpected result, especially considering that the illustrated apron has a 44% reduction in leg injury as well as improved part performance and excellent part strength. (See FIGS. 7-10.)

Notably, the weight savings can be greater than 0.6 kg, depending on what it is compared against, which is significant. Notably, in apron 55, the force deflection curve rises rapidly (as rapid as possible given design constraints) and continues to rise during at least 90% of its useful impact stroke. (See FIG. 15). Notably, the undulating wave shape of the present apron 55 provides a much higher load than previous known aprons, which is believed to be due in significant part because of impact dynamics that occur during impact against a nose of the apron's (55) wave shape. By way of physical comparison, a benchmarked prior art apron provided a resistance force of 3-4 kN, while the present apron 55 provided a resistance force of about 8-10 kN.

The present innovation includes related methods of design. In one form, a method includes steps of providing a vehicle front end including a primary bumper system with a bumper reinforcement beam and a polymeric energy absorber on a face of the beam, and providing an apron extending generally horizontally and supported on the vehicle front end at a location spaced below the primary bumper system. The method further includes impact testing the polymeric energy absorber and the apron to determine force deflection curves of the polymeric energy absorber on the reinforcement beam and of the apron when impacted against a pedestrian-leg-simulating test device; and tuning an impact strength of the polymeric energy absorber and the apron to provide similar force deflection curves when impacted by the pedestrian-leg-simulating test device.

In a narrower form, the method includes a step of reducing a beam strength and overall weight (e.g. material thickness) of the reinforcement beam to provide an overall force deflection curve that causes reduced injury to the impacted pedestrian leg.

A related method includes steps of providing a vehicle front end including a primary bumper system with a bumper reinforcement beam and a polymeric energy absorber on a face of the beam, and providing an apron extending generally horizontally and supported on the vehicle front end at a location spaced below the primary bumper system. The method further includes impact testing the polymeric energy absorber and the apron to determine force deflection curves of the polymeric energy absorber on the reinforcement beam and of the apron when impacted against a pedestrian-leg-simulating test device. Also, the method includes tuning an impact strength of the apron to provide a force deflection curve of the apron when impacted by the pedestrian-leg-simulating test device, generates a force deflection curve that continues to rise during at least 90% of its useful impact stroke.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. An apron for a vehicle front end under a primary bumper beam, comprising:
   a unitary molded component having a front structure and a rear structure joined by an offset portion, the front and rear structures extending at rearward downward angles, and the offset portion extending at a rearward upward angle.

2. The apron defined in claim 1, wherein the rearward downward angles of the front and rear structures extend at a same downward angle.

3. The apron defined in claim 1, wherein the front structure, rear structure, and offset portion define a same vertical cross-sectional thickness dimension.

4. The apron defined in claim 1, wherein upper and lower surfaces of the apron define an envelope, and wherein lines extending horizontally from a front edge of the apron stay within the envelope.

5. The apron defined in claim 1, wherein:
   the rear structure defines adjacent channels extending in a fore-aft direction with adjacent channels being alternatingly upwardly and downwardly open;
   the front structure has a constant fore-aft depth and extending a full width of the rear structure and defining a non-linear front edge; and
   the channels of the rear structure each form high and low force-generating locations when impacted, but the front structure distributes stress into the rear structure regardless of which channel is impacted.

6. An apron for a vehicle front end comprising:
   a unitary molded component having a front structure and a rear structure joined by an offset portion, the rear structure defining adjacent channels extending in a fore-aft direction with adjacent channels being alternatingly upwardly and downwardly open; the front structure having a constant fore-aft depth and extending a full width of the rear structure and defining a non-linear front edge; the channels of the rear structure each form high-impact-strength and low-impact-strength locations when impacted, but the front structure being configured to distribute stress uniformly into the rear section regardless of which location is impacted.

7. An apron for a vehicle front end under a primary bumper beam, comprising:
   a unitary molded component having a front structure and a rear structure joined by an offset portion the front and rear structures extending at rearward downward angles, and the offset portion extending at a rearward upward angle;
   wherein the front and rear structures and offset portion include upper and lower surfaces defining a boundary having a wave shape, and wherein the front structure defines a front edge with a tip that extends a full width of the front structure, and where lines extending horizontally rearward from the tip lie entirely within the boundary.

8. The apron defined in claim 7, wherein the lines define a horizontal plane.

9. An apron for a vehicle front end under a primary bumper beam, comprising:
   a unitary molded component having the front rear structures joined by an offset portion, the front structure and rear structures extending at rearward downward angles, and the offset portion extending at a rearward upward angle;
   wherein the front structure includes a front end having a lowest point and the rear structure includes a highest point, and wherein the offset includes material connecting the lowest point to the highest point, a step height being defined by the distance between the lowest point and the highest point, and wherein the rear structure includes columns having a beam vertical dimension; and
   wherein a ratio of the step height to beam vertical dimension is 125% to 300%.

10. The apron defined in claim 9, wherein the ratio is 150% to 300%.

11. The apron defined in claim 10, wherein the ratio is 200% to 300%.

12. An apron for a vehicle front end under a primary bumper beam, comprising:
    a unitary molded component having a front structure and a rear structure joined by an offset portion, the front and rear structures extending at rearward downward angles, and the offset portion extending at a rearward upward angle;
    wherein the front structure includes a front end with a tip and has a front fore-aft dimension; and wherein the apron has a total fore-aft dimension;
    wherein the front fore-aft dimension as a ratio with the total fore-aft dimension is within a range of between 5% and 75%.

13. The apron defined in claim 12, wherein the ratio is between 10% and 25%.

14. The apron defined in claim 12, wherein the ratio is between 60% and 75%.

15. A vehicle system comprising:
    a vehicle front end;

a primary bumper system including a bumper reinforcement beam and a polymeric energy absorber on a face of the beam; and an apron extending generally horizontally and supported on the vehicle front end at a location spaced below the primary bumper system;

the polymeric energy absorber and the apron having structure that, when impacted against a pedestrian leg, define force deflection curves having a same shape.

16. A vehicle system comprising:

a vehicle front end;

a primary bumper system including a bumper reinforcement beam and a polymeric energy absorber on a face of the beam; and an apron extending generally horizontally and supported on the vehicle front end at a location spaced below the primary bumper system;

the polymeric energy absorber and the apron including faces defining a vertical structure where a pedestrian leg is impacted substantially simultaneously by both faces during an impact, and the apron, when impacted against the pedestrian leg, generates a force deflection curve that continues to rise during at least 90% of an impact stroke of at least 50 cm.

17. A method of designing a vehicle system comprising steps of:

providing a vehicle front end including a primary bumper system with a bumper reinforcement beam and a polymeric energy absorber on a face of the beam, the energy absorber having a first force-deflection curve when impacted by a pedestrian-leg-simulating test device;

designing an apron to have a second force-deflection curve that, when impacted by a pedestrian-leg-simulating test device, has a same shape as the first force-deflection curve;

attaching the apron to the vehicle front end below the primary bumper system; and impacting the polymeric energy absorber and the apron against a pedestrian-leg-simulating test device to determine leg injury characteristics.

* * * * *